United States Patent
Bennett et al.

(10) Patent No.: US 10,411,968 B2
(45) Date of Patent: Sep. 10, 2019

(54) SYSTEMS AND METHODS FOR SHARING NETWORK INFORMATION

(71) Applicant: CoCo Communications Corp., Seattle, WA (US)

(72) Inventors: Henry M. Bennett, Seattle, WA (US); A. Riley Eller, Seattle, WA (US)

(73) Assignee: COCO COMMUNICATIONS CORP, Seattle, WA (US)

( * ) Notice: Subject to any disclaimer, the term of this patent is extended or adjusted under 35 U.S.C. 154(b) by 93 days.

(21) Appl. No.: 15/462,674

(22) Filed: Mar. 17, 2017

(65) Prior Publication Data
US 2017/0272329 A1    Sep. 21, 2017

Related U.S. Application Data (60) Provisional application No. 62/310,391, filed on Mar. 18, 2016.

(51) Int. Cl.
*H04L 12/24* (2006.01)
*H04L 12/741* (2013.01)
*H04L 12/743* (2013.01)

(52) U.S. Cl.
CPC ............. *H04L 41/12* (2013.01); *H04L 45/54* (2013.01); *H04L 45/7453* (2013.01)

(58) Field of Classification Search
CPC ...... H04L 41/12; H04L 45/54; H04L 45/7453
See application file for complete search history.

(56) References Cited

U.S. PATENT DOCUMENTS

| | | | |
|---|---|---|---|
| 2004/0013120 A1* | 1/2004 | Shen | H04L 12/4679 370/395.31 |
| 2004/0120266 A1 | 6/2004 | Ko et al. | |
| 2005/0030921 A1 | 2/2005 | You | |
| 2007/0076718 A1 | 4/2007 | Viswanath | |
| 2007/0133488 A1 | 6/2007 | Muthuswamy et al. | |
| 2009/0238076 A1 | 9/2009 | Retana et al. | |
| 2014/0112126 A1 | 4/2014 | Claessens et al. | |
| 2014/0207933 A1 | 7/2014 | Tucker et al. | |
| 2015/0312144 A1* | 10/2015 | Gobriel | H04L 45/7453 709/242 |
| 2016/0173445 A1* | 6/2016 | Mosko | H04L 61/3005 370/392 |
| 2017/0331739 A1* | 11/2017 | Sharma | H04L 63/0254 |

OTHER PUBLICATIONS

Search Report and Written Opinion from international application No. PCT/US2017/023075, dated Jun. 6, 2017, 16 pages.

* cited by examiner

*Primary Examiner* — Luat Phung
(74) *Attorney, Agent, or Firm* — Lowe Graham Jones PLLC; Raymond Armentrout (57) ABSTRACT

Techniques for sharing network information, such as routing table information, are described. In some examples, network nodes share information about the topology of their network. For example, nodes may share routing tables with their neighbors from time to time. To improve the performance of the network, by reducing the overhead of transmitting routing tables, the nodes share their routing tables with neighbor nodes only when those tables are updated or upon request. In other circumstances, such as when a routing table has not changed since it was last shared, each network node instead transmits an indicator, such as a routing table checksum, hash, or the like, that can be used by a neighbor node to determine the routing table is unchanged.

18 Claims, 9 Drawing Sheets

SYSTEMS AND METHODS FOR SHARING NETWORK INFORMATION

PRIORITY CLAIM

This application claims the benefit of U.S. Provisional Patent Application No. 62/310,391, entitled "SYSTEMS AND METHODS FOR SHARING NETWORK INFORMATION" and filed on Mar. 18, 2016, the content of which is incorporated herein by reference in its entirety.

TECHNICAL FIELD

The present disclosure relates to methods, techniques, and systems for sharing network information and, more particularly, to methods, techniques, and systems for efficiently distributing routing table information amongst network nodes.

BACKGROUND

Figure 1A:
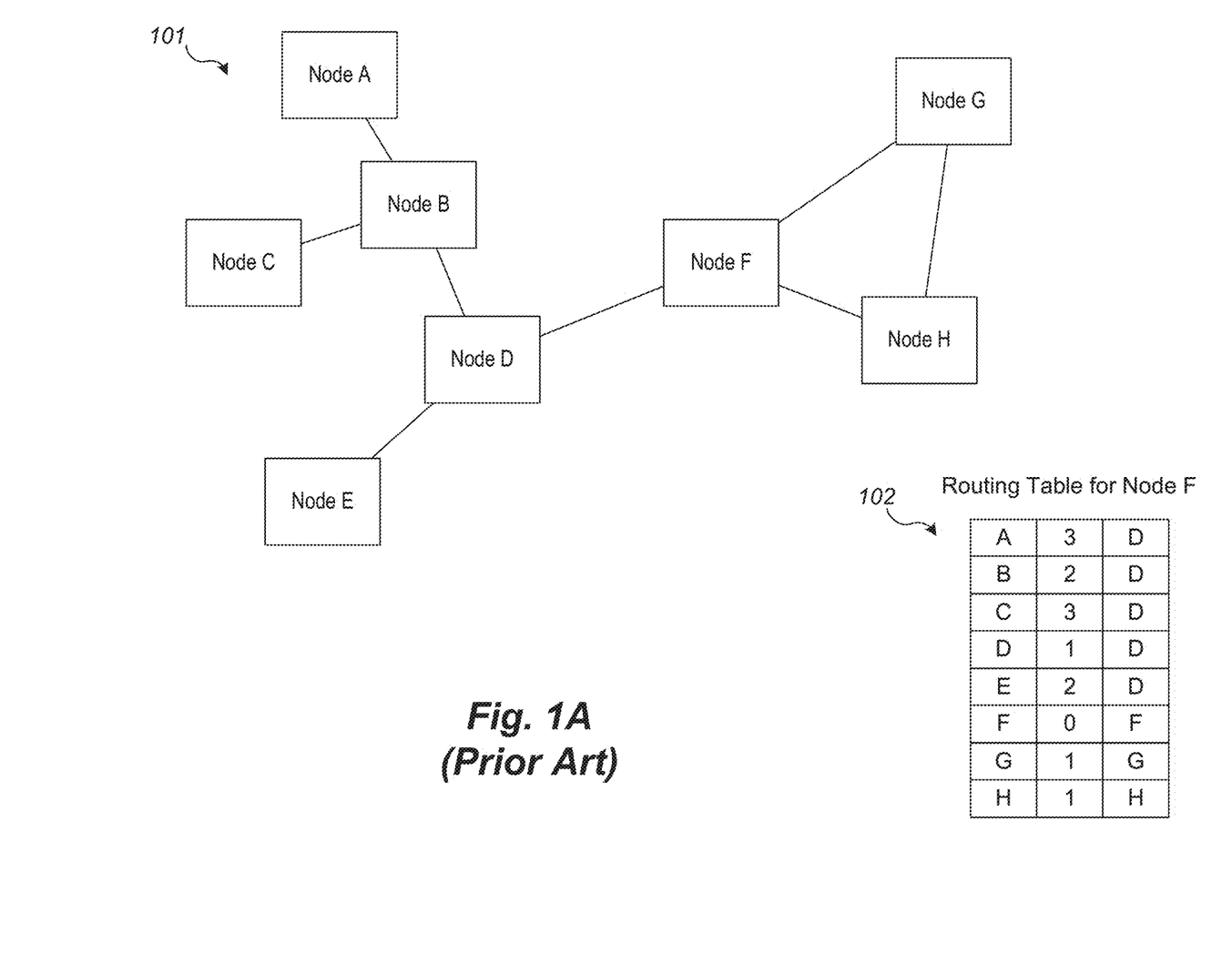
FIG. 1A illustrates an example network and an example routing table for one of the nodes in the network.

FIG. 1A illustrates an example network 101 and an example routing table 102 for one of the nodes in the network. The illustrated network 101 is a packet-switched network comprising nodes A-H. In order for the nodes to be able to communicate with one another, each node needs to know how to address and transmit a packet onwards to a given destination node. To do so, each node needs to have some understanding of the network topology, so that it can determine the appropriate network link to use when transmitting a packet to a given destination. Routing protocols are employed to distribute knowledge about the topology of a network amongst the nodes of the network.

Two main classes of routing protocol exist: distance-vector routing protocols and link-state protocols. In a distance-vector routing protocol, each node maintains a routing table of nodes that each have an associated "next hop" node and an associated cost. In an initial condition, each node only knows about itself. In operation, each node periodically (e.g., every 30 seconds) informs its neighbors of its understanding of the network topology, by transmitting its routing table to each neighbor. In an initial iteration, each node initially informs its neighbors only of its own existence. Each neighbor uses this information to update its routing table by adding an entry for each neighbor node. At each subsequent iteration of the protocol, a given node's routing table is updated as more information is received from further reaches of the network. Eventually, when each node has learned about every other node, the protocol converges. Changes to the network (e.g., such as nodes going offline) are similarly shared, and eventually propagate through the network.

The routing information stored by node F is shown in table 102. Each row of the table associates a destination node with a cost and a "next hop" node. When node F transmits a packet to node A, node F utilizes the table 102 to determine that the next hop for the packet is via node D. Node F accordingly transmits the packet on the link connecting nodes F and D. Similarly, upon receipt of the packet, node D consults its routing table (not shown) to determine that the next hop for the packet is via node B. This process continues until the packet eventually reaches node A.

One of the problems with routing protocols such as distance-vector routing relates to the amount of information that must be communicated between nodes in order to maintain and distribute an accurate model of the network topology amongst the nodes. Note first that the number of rows in each routing table will here equal the number of nodes on the network 101. For example, table 102 includes eight rows. In order to respond to changes in the network (e.g., nodes or routes being added or removed), the routing protocol requires that the routing table of each node be shared with its neighbors periodically, such as every 5, 10, or 30 seconds. The shorter the time period (sometimes known as the "update interval"), the more responsive the protocol will be to network changes, but the more network bandwidth will be consumed by transmission of routing tables. In small networks, with only a few nodes, this may not be a problem. But in very large and/or highly dynamic networks, the operation of the routing protocol can impose significant overhead.

Figure 1B:
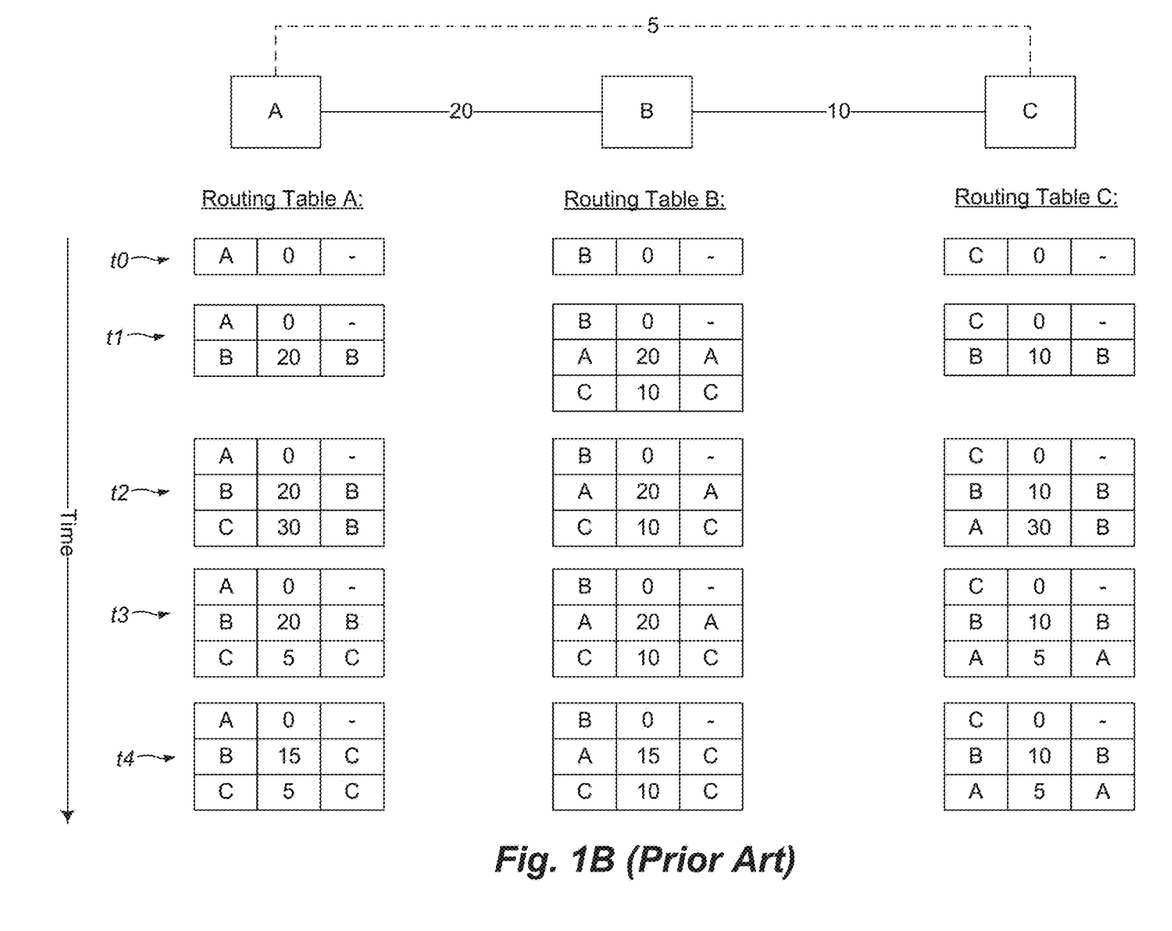
FIG. 1B illustrates operation of an example distance-vector routing protocol.

FIG. 1B illustrates operation of an example distance-vector routing protocol. More particularly, FIG. 1B depicts a simple network consisting of three nodes A-C. Initially, a link of cost 20 connects nodes A and B, and a link of cost 10 connects nodes B and C. A time t0, each of nodes A-C has a single-row routing table that includes only information about itself, which it then shares with its neighbors.

At time t1, having received the routing tables transmitted by its neighbors at time t0, each node adds rows to its table. For example, node A adds a row to its table reflecting the existence of node B on the network and the corresponding cost of 20. Node B similarly adds rows for nodes A and C. Node C adds a row for node B. Each node then shares its modified routing table with its neighbors.

At time t2, each node has received from its neighbors the routing table(s) transmitted at time t1. For node A, this means adding a row for node C, because it has now learned (from node B), that node C is reachable via node B. The cost field for node C is 30, reflecting the cost of 20 for the A-B link and the cost of 10 for the B-C link. Node B makes no changes to its tables, as it has learned no new information. Node C adds a row for node A, because it has now learned (from node B), that node A is reachable via node B.

At some time after time t2 and before time t3, the illustrated network is modified by adding a new link of cost 5 between nodes A and C. At time t3, nodes A and C become aware of this change and update their tables accordingly.

At time t4, each node has received from its neighbors the routing table(s) transmitted at time t3. Node A learns from node C that node C can communicate with node B at a cost of 10. This cost, added to the A-C link cost of 5 is a total of 15, and is lower than the previously stored cost of 20 for communicating with B. Accordingly, node A updates the row for node B to reflect the preferred route (via C) and updated cost of 15. By similar logic, node B updates its entry for node A, to reflect the fact that it can communicate with node A via node C at a total cost of 15.

DETAILED DESCRIPTION

Embodiments described herein provide enhanced computer- and network-based methods, devices, and systems for efficiently distributing routing table information amongst network nodes. The described techniques address shortcomings with existing routing protocols, as discussed further below.

1. Overview

The described techniques address the inefficiencies in typical distance-vector routing protocols by only transmitting entire routing tables when necessary, and instead transmitting routing table digests whenever possible. Observe that the protocol illustrated with respect to FIGS. 1A and 1B must transmit entire routing tables during every update interval. As noted, this strategy can impose considerable network overhead, depending on the size of the update interval and the size of the network. As described in detail below, the described techniques improve upon network technologies and the routing protocols used therein by reducing the amount of network resources dedicated to transmitting routing or other information that is shared in order to manage the efficient operation of the network.

Figure 2A:
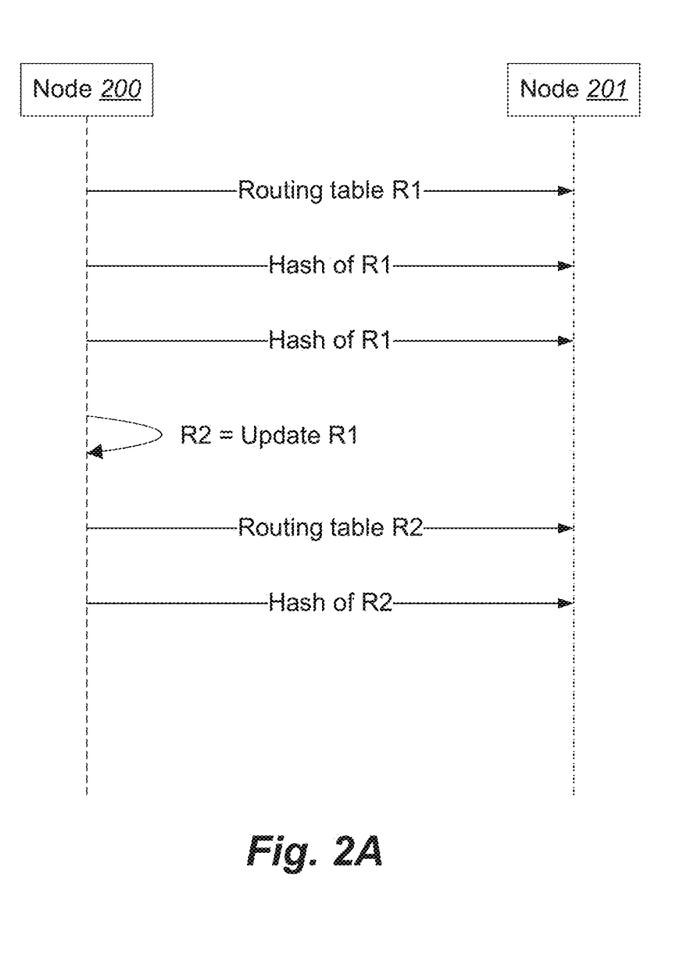
FIGS. 2A and 2B illustrate the distribution of routing table information according to one embodiment.
Figure 2B:
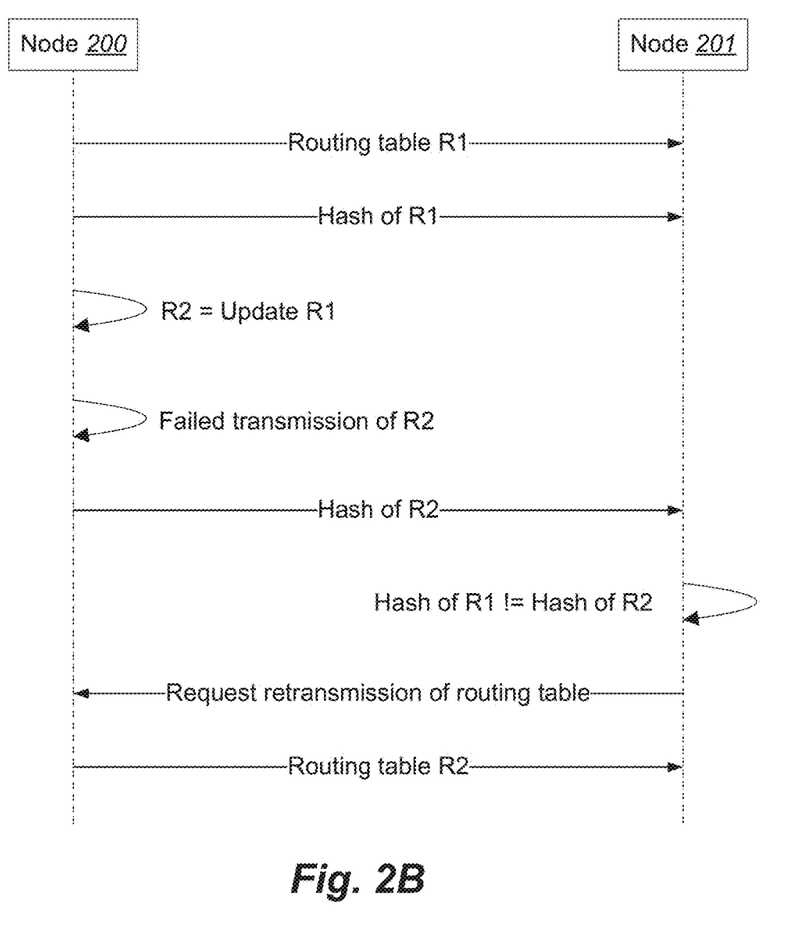

FIGS. 2A and 2B illustrate the distribution of routing table information according to one embodiment. FIGS. 2A and 2B are sequence diagrams that depict the communications between two example network nodes, nodes 200 and 201. The nodes 200 and 201 include logic that is configured to perform the techniques describe herein, such as a network information distribution module 100 described with respect to FIG. 4, below. Nodes 200 and 201 may be any computing devices configured to communicate over a network, including routers, wireless access points, personal computers, mobile devices, or the like.

FIG. 2A illustrates the distribution of a modified routing table according to one embodiment. In FIG. 2A, node 200 initially transmits an entire routing table R1 to node 201. In the next update interval, and as long as there are no changes to the routing table R1, node 200 transmits a hash of the table R1 to node 201. Embodiments may employ any suitable hash function. Cryptographic hash functions may be employed to generate the hash of the routing table. In general, any function for determining message integrity, including checksum functions or cryptographic hash functions that are no longer considered secure (e.g., MD5 or SHA-1) can be employed to generate the required hash or other indicator that is transmitted between nodes when the routing table is unchanged.

At some point in time, node 200 updates routing table R1 to generate a new table, R2. At this time, node 200 transmits the entirety of the routing table R2 to node 201. Other embodiments may transmit less than the routing table R2, such as by only transmitting changed portions. Then, having transmitted R2 to node 201, node 201 begins transmitting hashes of R2 during subsequent update intervals, until there is some change to R2.

FIG. 2B illustrates a failed transmission of a modified routing table. In FIG. 2B, node 200 initially transmits routing table R1 to node 201. In the next update interval, node 200 transmits a hash of R1, reflecting the fact that R1 has not changed. Table R1 is next updated to become table R2. Node 200 transmits table R2 to node 201, but the transmission fails, such as due to packet loss or the like. Node 200 does not know that the transmission failed, and in the next update interval, transmits a hash of R2 to node 201.

Every time node 201 receives a routing table, it computes a hash for the received routing table. Then, node 201 can compare subsequently received hashes to the computed hash to determine whether its routing information is still current, or whether a transmission of an updated table has failed. In this example, node 201, upon receiving the hash of R2, will compares that value to the previously computed hash of R1. Determining that the two values do not match, node 201 requests retransmission of the routing table from node 200. In response to the retransmission request, node 200 retransmits table R2, thereby synchronizing the routing information shared by nodes 200 and 201.

In some embodiments, the nodes in the network each implement a modified version of a conventional routing protocol, such as Routing Information Protocol ("RIP"). The protocol may be modified to perform the functions as described herein, including transmitting a digest of the routing table when it has not changed since a prior transmission. Other protocols may be utilized, such as Interior Gateway Routing Protocol ("IGRP"), Enhanced Interior Gateway Routing Protocol ("EIGRP"), or the like.

Although these techniques are primarily described in the context of network protocols, the techniques are equally applicable to other contexts. In general, the described techniques can be used to share other types of information used or required to operate a network.

2. Example Processes

FIGS. 3A-3D are example flow diagrams of network information distribution processes performed by example embodiments.

Figure 3A:
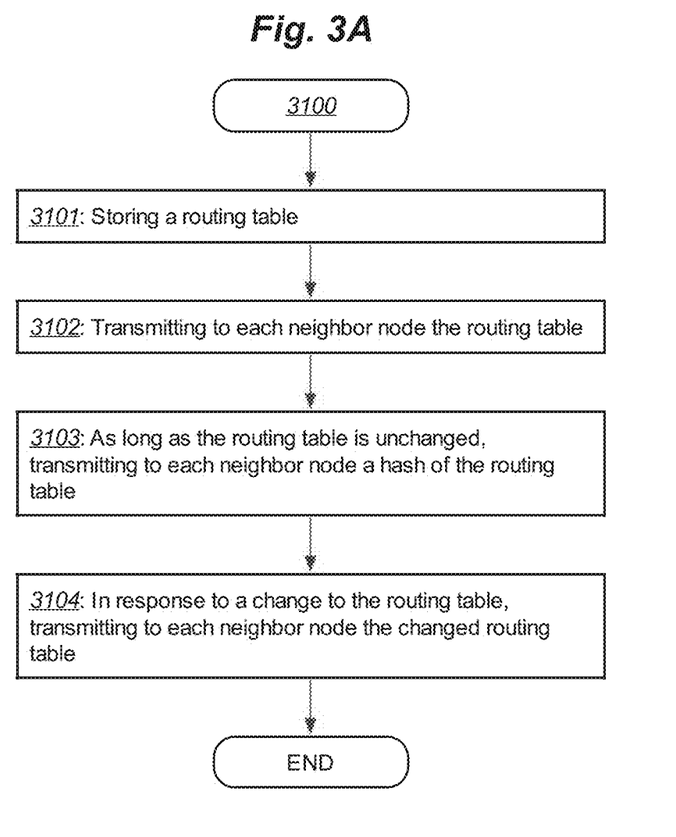
FIGS. 3A-3D are example flow diagrams of network information distribution processes performed by example embodiments.

FIG. 3A is a flow diagram of example logic in a first network node in a network of multiple nodes. The illustrated logic in this and the following flow diagrams may be performed by, for example, the network information distribution module 100 described with respect to FIG. 4, below. More particularly, FIG. 3A illustrates a process 3100 that includes the following block(s).

Block 3101 includes storing a routing table, wherein the routing table lists, for each destination node of the multiple nodes on the network, a next hop node that serves as a forwarding destination for network packets addressed to the destination node, such that a packet addressed to the destination node is transmitted to the next hop node for transmission onward to the destination node. Example routing tables are shown and described with respect to FIGS. 1A and 1B, above.

Block 3102 includes transmitting to each neighbor node the routing table stored by the first node. A neighbor node may be any node that is reachable via a link having no intermediate nodes. The table may be transmitted in various ways such as by broadcast message, point-to-point transmission, or the like.

Block 3103 includes as long as the routing table is unchanged, transmitting to each neighbor node a hash of the routing table. Once the routing table is initially transmitted to the neighbor nodes, the process transmits hashes (or other suitable digests or checksums) of the routing table rather than the table itself.

Block 3104 includes in response to a change to the routing table, transmitting to each neighbor node the changed routing table. When the routing table changes, such as because a node or link has been added to or removed from the network, the process once again transmits the routing table, or alternatively, just the changed portions thereof.

Figure 3B:
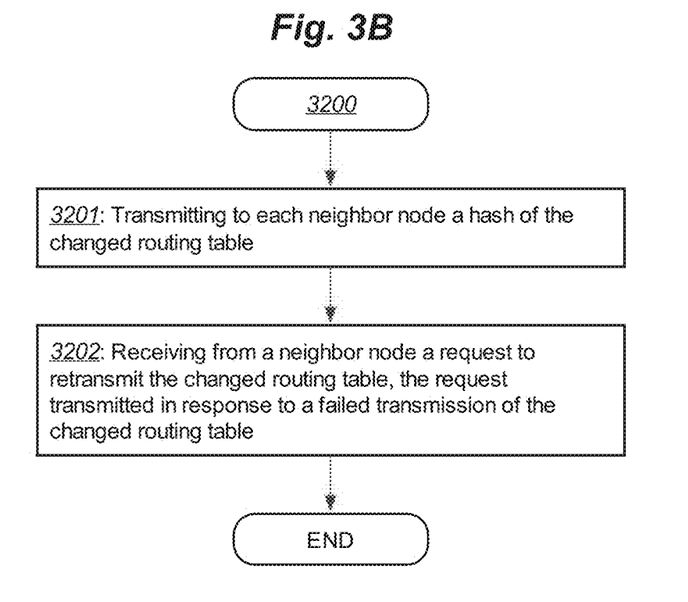

FIG. 3B is a flow diagram of example logic illustrating an extension of process 3100 of FIG. 3A. This figure illustrates the receipt and processing of request for retransmission of a routing table. More particularly, FIG. 3B illustrates a process 3200 that includes the process 3100, and which further includes the following block(s).

Block 3201 includes transmitting to each neighbor node a hash of the changed routing table.

Block 3202 includes receiving from a neighbor node a request to retransmit the changed routing table, the request transmitted in response to a failed transmission of the changed routing table, the failed transmission detected because the hash of the routing table does not match the hash of the changed routing table. The neighbor node compares each received hash to a hash that it computes for the most recently received routing table. If the received hash and the computed hash are not equal, then the neighbor node will transmit a request to retransmit the routing table. When this request is received by the first node, the first node responds by making the requested retransmission.

Figure 3C:
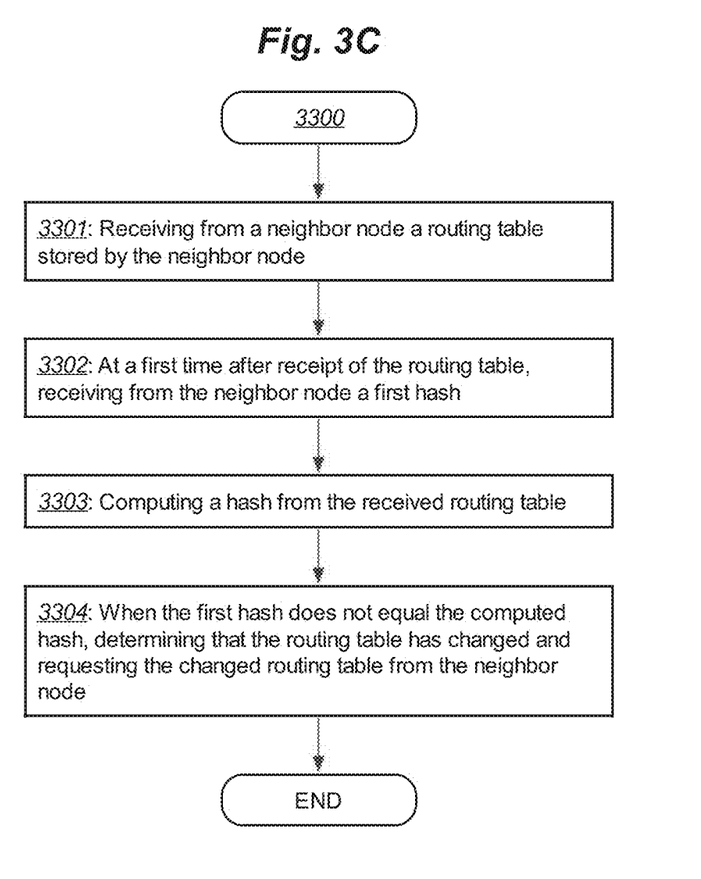

FIG. 3C is a flow diagram of example logic illustrating an extension of process 3100 of FIG. 3A. This figure illustrates a request for retransmission of a routing table, transmitted when the hash of a previously received routing table does not match a received hash. More particularly, FIG. 3C illustrates a process 3300 that includes the process 3100, and which further includes the following block(s).

Block 3301 includes receiving from a neighbor node a routing table stored by the neighbor node. The described process is bi-directional. That is, each node concurrently shares its routing information with its neighbors (e.g., transmit its routing table and corresponding hashes) in addition to receiving and verifying information shared by its neighbors.

Block 3302 includes at a first time after receipt of the routing table, receiving from the neighbor node a first hash. Typically, this hash will be a hash of the routing table most recently transmitted by the neighbor node, although it is possible that this routing table was lost in transit.

Block 3303 includes computing a hash from the received routing table. To verify that the neighbor's routing table is unchanged, a hash for the received is computed.

Block 3304 includes when the first hash does not equal the computed hash, determining that the routing table has changed and requesting the changed routing table from the neighbor node. The node will continue to transmit a retransmission request until a stopping condition occurs. Stopping conditions may include the receipt of the requested routing table, a timeout (e.g., to account for nodes that have gone offline), or similar.

Figure 3D:
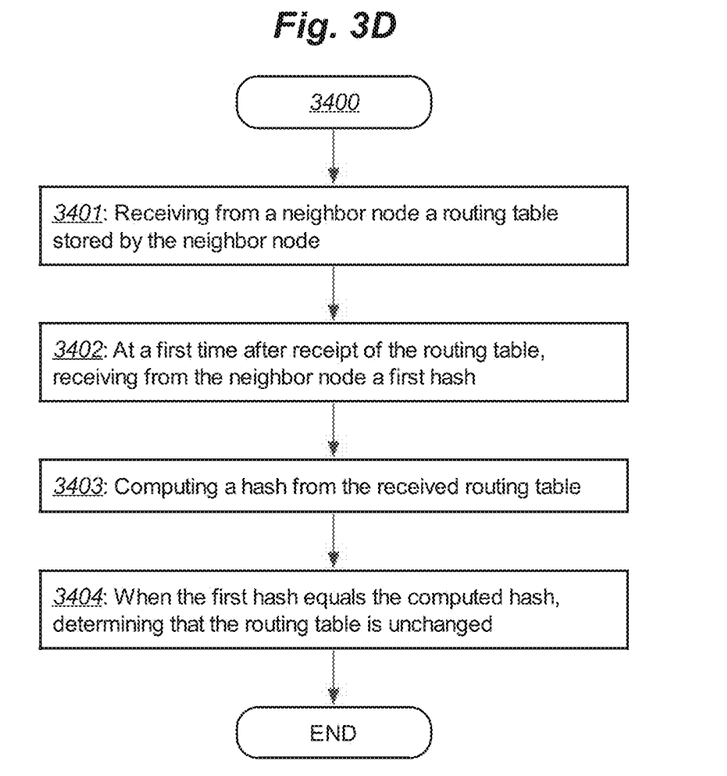

FIG. 3D is a flow diagram of example logic illustrating an extension of process 3100 of FIG. 3A. This figure illustrates a determination that a routing table of a neighbor node is unchanged. More particularly, FIG. 3D illustrates a process 3400 that includes the process 3100, and which further includes the following block(s).

Block 3401 includes receiving from a neighbor node a routing table stored by the neighbor node.

Block 3402 includes at a first time after receipt of the routing table, receiving from the neighbor node a first hash. Typically, this hash will be a hash of the routing table most recently transmitted by the neighbor node, although it is possible that this routing table was lost in transit.

Block 3403 includes computing a hash from the received routing table. To verify that the neighbor's routing table is unchanged, a hash for the received is computed.

Block 3404 includes when the first hash equals the computed hash, determining that the routing table is unchanged. No further action need be taken when the routing table is unchanged, although the protocol may include other operations performed as part of this or the other processes described herein. For example, if no hash (or other communication) is received from a given neighbor node for a given time period, responsive actions may be taken, such as transmitting a request for the node's routing table (or current hash), removing a table entry associated with the node, increasing the link cost associated with the node, or the like.

Other functions may be performed. For example, one or more of the above processes may include the operation of storing a hash (e.g., a received hash or computed hash) in association with a network identifier (e.g., IP address) of a node in a network. A table, database, dictionary, or similar structure may be used. By storing a recently computed/received hash, the process can minimize the information stored, such as by not storing the routing information received from other nodes, and instead only storing hashes of that information. By storing hashes in association with network identifiers, the process can later look up a previously computed hash in order to verify a newly received hash.

3. Example Computing System Implementation

Figure 4:
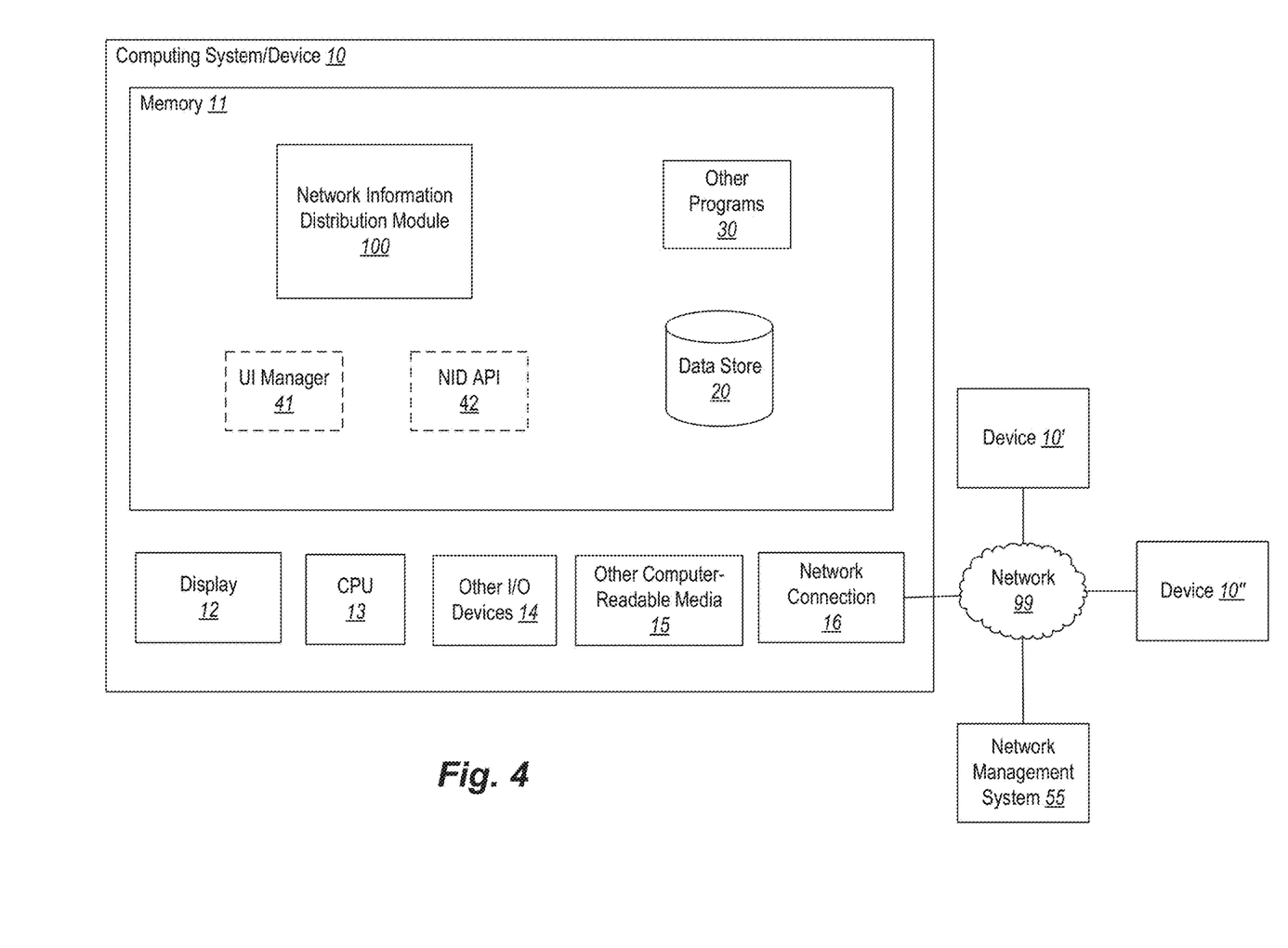
FIG. 4 is an example block diagram of an example computing system for implementing and performing network information distribution according to an example embodiment.

FIG. 4 is an example block diagram of an example computing system or device for implementing and performing network information distribution according to an example embodiment. In particular, FIG. 4 shows a computing system or device 10 that may be utilized to implement a network information distribution module 100. The module 100 may be part of a networking or routing module provided by or as part of a device 10 that is a computer (e.g., laptop, desktop, server, mobile device) or networking device (e.g., router, wireless access point, switch). The module 100 performs one or more of the process described above.

Note that one or more general purpose or special purpose computing systems/devices may be used to implement the module 100. In addition, the computing system 10 may comprise one or more distinct computing systems/devices and may span distributed locations. Furthermore, each block shown may represent one or more such blocks as appropriate to a specific embodiment or may be combined with other blocks. Also, the module 100 may be implemented in software, hardware, firmware, or in some combination to achieve the capabilities described herein.

In the embodiment shown, computing system 10 comprises a computer memory ("memory") 11, a display 12, one or more Central Processing Units ("CPU") 13, Input/Output devices 14 (e.g., keyboard, mouse, CRT or LCD display, and the like), other computer-readable media 15, and network connections 16. The module 100 is shown residing in memory 11. In other embodiments, some portion of the contents, some or all of the components of the module 100 may be stored on and/or transmitted over the other computer-readable media 15. The module 100 preferably executes on one or more CPUs 13 and performs the techniques described herein. Other code or programs 30 (e.g., an administrative interface, a Web server, and the like) and potentially other data repositories, such as data repository 20, also reside in the memory 11, and preferably execute on one or more CPUs 13. Of note, one or more of the components in FIG. 4 may not be present in any specific implementation. For example, some embodiments may not provide other computer readable media 15 or a display 12.

The module 100 interacts via the network 99 with other devices 10' and 10", and a network management system 55. The network 99 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. The other devices 10' and 10" are constituted similarly to device 10. They may be other network devices such as routers, access points, firewalls, or the like. Alternatively, or in addition, they may be networked computing systems operated by users, such as desktop computers, laptop computers, mobile devices, or the like. The network management system 55 may be a management console or application that is used to control or otherwise interact with the module 100.

The module 100 is shown executing in the memory 11 of the computing system 10. Also included in the memory 11 are a user interface manager 41 and an application program interface ("API") 42. The user interface manager 41 and the API 42 are drawn in dashed lines to indicate that in other embodiments, functions performed by one or more of these components may be performed externally to the module 100.

The UI manager 41 provides a view and a controller that facilitate user interaction with the module 100 and its various components. For example, the UI manager 41 may provide interactive access to the module 100, such that users can interact with the module 100, such as by modifying configuration settings (e.g., update interval time period), viewing logs, or the like. In some embodiments, access to the functionality of the UI manager 41 may be provided via a Web server, possibly executing as one of the other programs 30. In such embodiments, a user operating a Web browser executing the network management system 55 can interact with the module 100 via the UI manager 41.

The API 42 provides programmatic access to one or more functions of the module 100. For example, the API 42 may provide a programmatic interface to one or more functions of the module 100 that may be invoked by one of the other programs 30 or some other module. In this manner, the API 42 facilitates the development of third-party software, such as user interfaces, plug-ins, adapters (e.g., for integrating functions of the module 100 into Web applications), and the like.

In addition, the API 42 may be in at least some embodiments invoked or otherwise accessed via remote entities, such as code executing on one of the network devices 10' and 10" and/or the network management system 55, to access various functions of the module 100. For example, the network management system 55 may specify configuration settings and/or obtain log information via the API 42. The API 42 may also be configured to provide management widgets (e.g., code modules) that can be integrated into the third-party applications 55 and that are configured to interact with the module 100 to make at least some of the described functionality available within the context of other applications (e.g., mobile apps).

In an example embodiment, components/modules of the module 100 are implemented using standard programming techniques. For example, the module 100 may be implemented as a "native" executable running on the CPU 13, along with one or more static or dynamic libraries. In other embodiments, the module 100 may be implemented as instructions processed by a virtual machine that executes as one of the other programs 30. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing, remote procedure call, or other distributed computing paradigms. Equivalent synchronous embodiments are also supported. Also, other functions could be implemented and/or performed by each component/module, and in different orders, and by different components/modules, yet still achieve the described functions.

In addition, programming interfaces to the data stored as part of the module 100, such as in the data store 20, can be available by standard mechanisms such as through C, C++, C#, and Java APIs; libraries for accessing files, databases, or other data repositories; through representational languages such as XML; or through Web servers, FTP servers, or other types of servers providing access to stored data. The data store 20 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the module 100 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

While embodiments of the invention have been illustrated and described, as noted above, many changes can be made without departing from the spirit and scope of the invention. Accordingly, the scope of the invention is not limited by the above disclosure.

The invention claimed is:

1. A system comprising:
a network including multiple nodes, wherein each of the multiple nodes stores a routing table that lists, for each destination node of the multiple nodes on the network, a next hop node that serves as a forwarding destination for network packets addressed to the destination node, such that a packet addressed to the destination node is transmitted to the next hop node for forwarding onward to the destination node; and
wherein the multiple network nodes are each configured to:
transmit to each neighbor node a first routing table stored by the node;
after transmitting the first routing table, and as long as the first routing table is unchanged, transmit to each neighbor node a hash of the first routing table; and
in response to a change to the first routing table that results in a second routing table, transmit to each neighbor node the second routing table.

2. The system of claim 1, wherein the multiple network nodes are each configured to:
after transmitting the second routing table, and as long as the second routing table is unchanged, transmit to each neighbor node a hash of the second routing table;
receive from a neighbor node a request to retransmit the second routing table, wherein the request is made by the neighbor node in response to a failed transmission of the second routing table, wherein the failed transmission is detected by the neighbor node by determining that the hash of the first routing table is not equal to the hash of the second routing table; and
in response to the received request, transmit the second routing table to the neighbor node.

3. The system of claim 1, wherein the multiple network nodes are each configured to:
receive from another node a routing table stored by the another node;
at a first time that is after receipt of the routing table, receive a first hash; and
determine whether the routing table of the another node has changed based on whether the first hash is equal to a second hash computed from the received routing table.

4. The system of claim 3, wherein the multiple network nodes are each configured to: when it is determined that the routing table of the another node has changed, request retransmission of the changed routing table.

5. The system of claim 1, wherein the multiple network nodes are each configured to:
at a first time, receive a first hash computed from the routing table stored by another node; and
at a second time that is after the first time, receive a second hash computed from the routing table stored by the another node, the first hash being equal to the second hash and thereby indicating that the routing table has not changed since the first time.

6. The system of claim 5, wherein the multiple network nodes are each configured to: at a third time that is after the second time, receive an updated routing table from the another node.

7. The system of claim 5, wherein the multiple network nodes are each configured to:
at a third time that is after the second time, receive a third hash computed from the routing table stored by the another node, the third hash being not equal to the second hash and thereby indicating that the routing table has changed since the second time; and
in response to receiving the third hash, request a retransmission of the routing table from the another node.

8. A method in a first network node in a network of multiple nodes, the method comprising:
storing a routing table, wherein the routing table lists, for each destination node of the multiple nodes on the network, a next hop node that serves as a forwarding destination for network packets addressed to the destination node, such that a packet addressed to the destination node is transmitted to the next hop node for transmission onward to the destination node;
transmitting to each neighbor node the routing table stored by the first node;
as long as the routing table is unchanged, transmitting to each neighbor node a hash of the routing table; and
in response to a change to the routing table, transmitting to each neighbor node the changed routing table.

9. The method of claim 8, further comprising:
transmitting to each neighbor node a hash of the changed routing table; and
receiving from a neighbor node a request to retransmit the changed routing table, the request transmitted in response to a failed transmission of the changed routing table, the failed transmission detected because the hash of the routing table does not match the hash of the changed routing table.

10. The method of claim 8, further comprising:
receiving from a neighbor node a routing table stored by the neighbor node;
at a first time after receipt of the routing table, receiving from the neighbor node a first hash;
computing a hash from the received routing table; and
when the first hash does not equal the computed hash, determining that the routing table has changed and requesting the changed routing table from the neighbor node.

11. The method of claim 8, further comprising:
receiving from a neighbor node a routing table stored by the neighbor node;
at a first time after receipt of the routing table, receiving from the neighbor node a first hash;
computing a hash from the received routing table; and
when the first hash equals the computed hash, determining that the routing table is unchanged.

12. A computing device for facilitating communication on a network comprising multiple nodes, the computing device comprising:
a network interface configured to transmit and receive data to and from nodes of the network;
a processor; and a memory that stores a module that is configured, when executed by the processor, to:

store a routing table, wherein the routing table lists, for each destination node of the multiple nodes on the network, a next hop node that serves as a forwarding destination for network packets addressed to the destination node, such that a packet addressed to the destination node is transmitted to the next hop node for transmission onward to the destination node;

transmit to each neighbor node the routing table stored by the computing device;

as long as the routing table is unchanged, transmitting to each neighbor node a hash of the routing table; and in response to a change to the routing table, transmitting to each neighbor node the changed routing table.

13. The computing device of claim 12, wherein the module is further configured to:

transmit to each neighbor node a hash of the changed routing table; and receive from a neighbor node a request to retransmit the changed routing table, the request transmitted in response to a failed transmission of the changed routing table, the failed transmission detected because the hash of the routing table does not match the hash of the changed routing table.

14. The computing device of claim 12, wherein the module is further configured to:

receive from a neighbor node a routing table stored by the neighbor node;

at a first time after receipt of the routing table, receive from the neighbor node a first hash;

compute a hash from the received routing table; and when the first hash does not equal the computed hash, determine that the routing table has changed and request the changed routing table from the neighbor node.

15. The computing device of claim 12, wherein the module is further configured to:

receive from a neighbor node a routing table stored by the neighbor node;

at a first time after receipt of the routing table, receive from the neighbor node a first hash;

compute a hash from the received routing table; and when the first hash equals the computed hash, determine that the routing table is unchanged.

16. The computing device of claim 15, wherein the module is further configured to:

store the first hash in association with a network identifier of the neighbor node, without storing the received routing table itself;

upon subsequent receipt of a second hash from the neighbor node, look up the first hash based on the network identifier of the neighbor node; and compare the first hash to the second hash to determine whether the neighbor node has a changed routing table.

17. The computing device of claim 12, wherein the computing device is networking device that is a router or a wireless access point.

18. The computing device of claim 12, wherein the module is configured to transmit the routing table and the hash of the routing table in a modified version of the Routing Information Protocol.

* * * * *